United States Patent [19]
Brown

[11] 3,822,391
[45] July 2, 1974

[54] ELECTRIC MOTOR WINDING

[75] Inventor: Grayson Brown, Riverside, Conn.

[73] Assignee: Consolidated Foods Corporation, Old Greenwich, Conn.

[22] Filed: Jan. 11, 1973

[21] Appl. No.: 322,607

[52] U.S. Cl. ............................................. 310/194
[51] Int. Cl. ............................................. H02k 3/00
[58] Field of Search .......... 310/192, 194, 189, 214, 310/215, 218, 217, 254, 258, 259

[56] References Cited
UNITED STATES PATENTS

| | | | |
|---|---|---|---|
| 2,575,115 | 11/1951 | Linke | 310/194 |
| 2,931,930 | 4/1960 | Hanscom | 310/194 |
| 2,999,176 | 9/1961 | Lindstrom | 310/194 |
| 3,226,585 | 12/1965 | Roe | 310/194 |
| 3,463,955 | 8/1969 | Scardina | 310/217 |

Primary Examiner—R. Skudy

[57] ABSTRACT

In accordance with the present invention there is provided improved winding retention means for the field coils in the stator of a rotary electric machine, particularly for coils which are wound in place on the field core by an automatic winding machine. As is well known, winding guides are temporarily secured at each axial end of each of the stator poles. The shuttles of the winding machine wind successive turns of wire around the poles and in the space between the latter and the winding guides. The retention means includes insulated flat steel wire or strips which are secured to the core as by extending through passages or slots formed in the core laminations. These strips extend out from opposite ends of the core and underneath the winding guides during the winding operation so as to support the coils after the winding guides have been removed and thereafter are bent around the coils so as to securely anchor the latter to the core and retain them in place.

5 Claims, 6 Drawing Figures

PATENTED JUL 2 1974 3,822,391

ELECTRIC MOTOR WINDING

BACKGROUND OF THE INVENTION

Heretofore, field coils have been retained in place by strips of metal, tape or cord which are bent or tied around the turns at opposite ends of the core and which bear against the outer surface of the core, but are not secured to it in any manner and consequently do not securely anchor the coils to the core. Moreover, such retaining means have not been put in place until after the coils have been wound and the winding guides removed with the result that some of the turns may cascade, that is fall out of place.

SUMMARY OF THE INVENTION

During the winding of the field coils by the automatic winding machine, the insulated strips extend out from the opposite ends of the core and the extending ends are within or underneath removable wire guides. The guides serve to guide the wire and form it into turns of the coil and to temporarilly support the coil and the insulated strips. Upon the completion of the winding operation, when the guides are removed the strips prevent raveling or cascading and then the strips are bent around the coils to securely fix them to the core.

DESCRIPTION OF THE FIGURES

Referring to FIG. 1, reference character 10 designates a stator core, usually comprising a stack of laminations stamped from sheet steel and secured together by rivets 11. Each lamination is formed with pole pieces 12 and 14 having inner partial cylindrical surfaces 16. Slots 18 extend through the core on opposite sides of pole piece 12, while similar slots 20 are on opposite sides of pole piece 14. A hole 22 extends completely through the core at the circumferential center of each pole and electrically insulated flat steel strips 24 extend therethrough. After being inserted, each strip is bent to form off-sets 26 which bear against opposite ends of the core to prevent longitudinal displacement of the strip in the hole 22.

As shown in FIG. 2, preperatory to automatically winding field coils in the pairs of slots 18 and 20 respectively, winding forms or wire guides 28 are temporarily secured to the core in well known manner, each guide being formed with a recess for receiving the projecting end of a strip 24. As shown at 30, each guide is spaced from the adjacent end of the core a distance sufficient to accomodate the coil to be wound.

Figure 1:
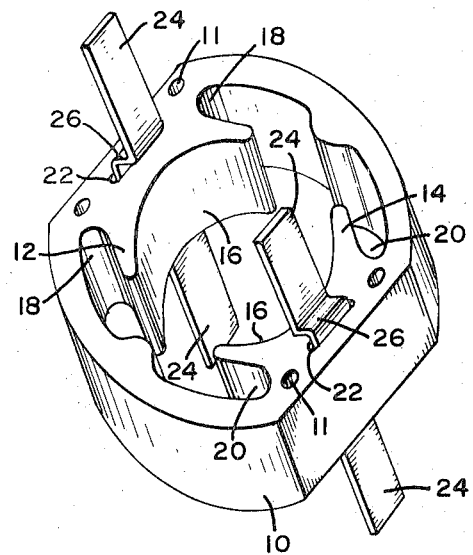
FIG. 1 is a prospective view of a stator core in accordance with my invention prior to the winding thereon of the field coils.
Figure 2:
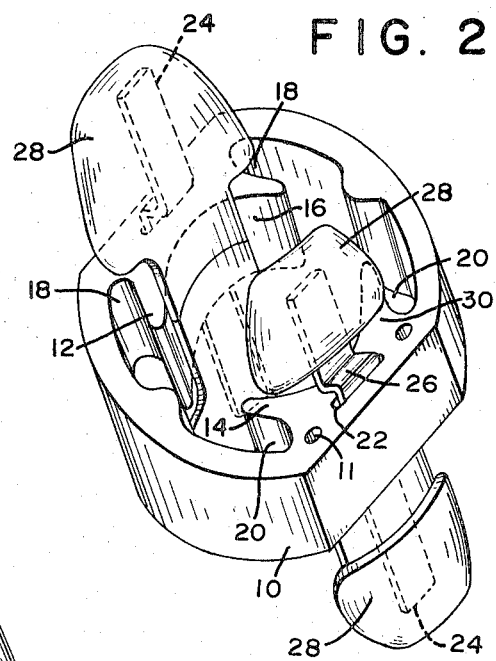
FIG. 2 is a prospective view of the core shown in FIG. 1 with the wire guides of an automatic winding machine in place.
Figure 3:
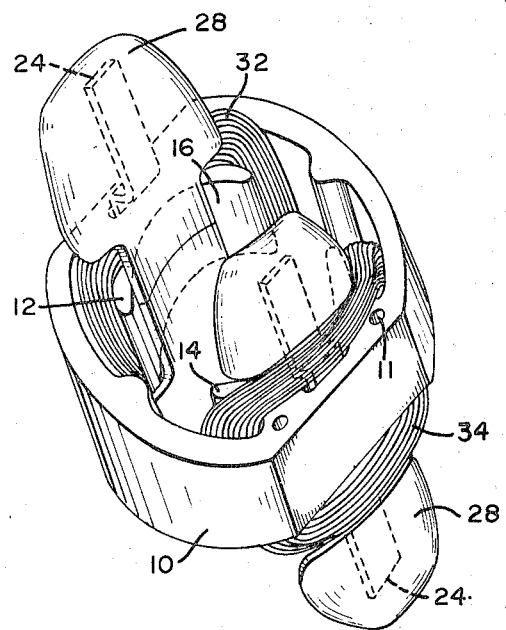
FIG. 3 is a view similar to FIG. 2, but showing the field coils wound on the core.
Figure 4:
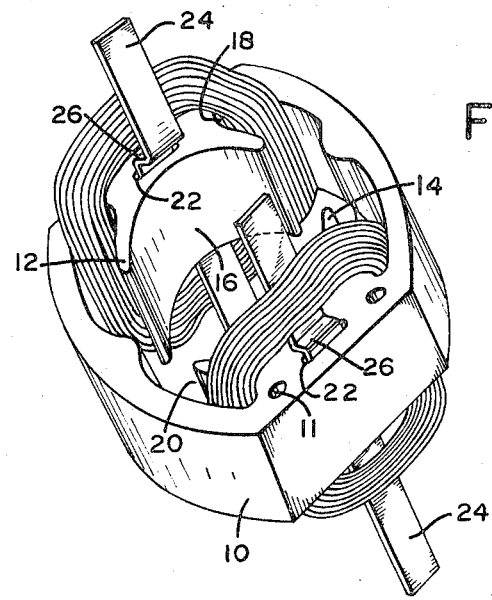
FIG. 4 is a view similar to FIG. 3, but with the wire guides removed.

During the automatic winding operation, which per se forms no part of this invention, a pair of wire feeding shuttles pass axially back and forth through the central space between the surfaces 16 and move circumferentially at the end of each pass so as to lay turns of insulated wire in the pairs of slots 18 and 20, and in the spaces 30, to form the field coils 32 and 34 respectively, shown in FIG. 3. When the winding is completed, the guides 28 are removed and the portions of the coils extending across the ends of the core are supported by the strips 24, as illustrated in FIG. 4, which prevents any of the turns from cascading or slipping out of place.

Figure 5:
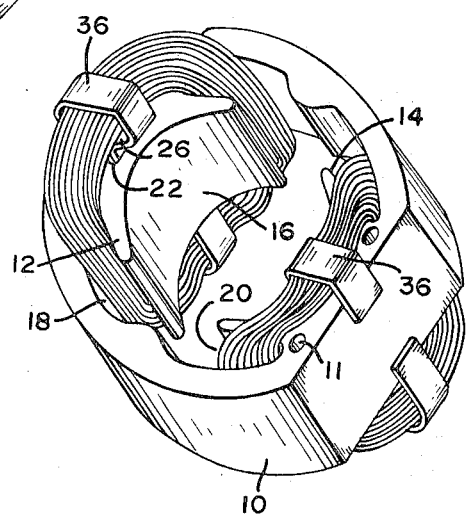
FIG. 5 is a view similar to FIG. 4 but showing a finished stator with the coil retention strips bent around the coils.

The final step is to bend the strips 24 tightly around the coils as indicated at 36 in FIG. 5 to securely anchor the coils to the core 10 which prevents even slight movement which could wear insulation off the wires of the coils thus creating shorts and grounds.

Figure 6:
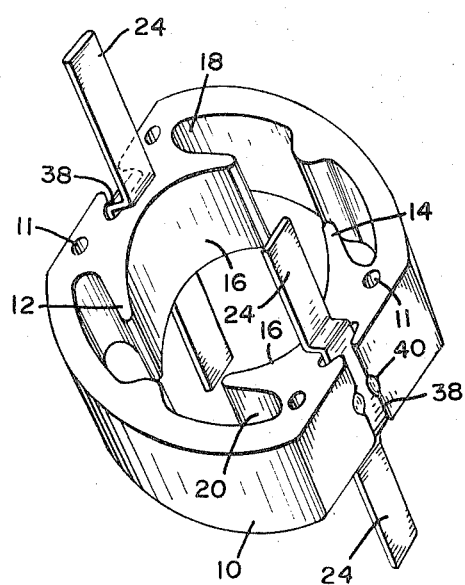
FIG. 6 is a view similar to FIG. 1, but showing a slightly modified embodiment of the invention.

The embodiment shown in FIG. 6 is similar to that above described, except that the strips 24 are received in slots 38 formed in the outer circumferential surface of the core 10 and secured therein by a staking operation which upsets the metal of the core at points along the slots, as shown at 40.

While I have shown two more or less specific embodiments of my invention, it is to be understood that this has been done for the purpose of illustration only, and that the scope of my invention is not to be limited thereby, but is to be determined by the appended claims.

What is claimed is:

1. In a rotary electric machine, a stator core having poles, a field coil comprising a plurality of turns of conductive insulated wire wound on each pole and extending axially on either side thereof, said core being formed with an axially extending aperture therethrough located at the circumferential center of each pole, and a strip of bendable metal secured to said core extending through each aperture and axially beyond said core in each direction, the extending portions of said turns being supported by the extending portions of said strips, said extending portions of said strips being bent around said extending portions of said turns for anchoring said turns in fixed position on said core.

2. A device as defined in claim 1 in which said metal strips are insulated.

3. A device as defined in claim 1 in which said strips are off-set at the ends of said apertures and bear against the end surfaces of said stator.

4. A device as defined in claim 2 in which said axially extending apertures are slots formed in the outer circumferential surface of said stator.

5. A device as defined in claim 4 in which the edges of said slots are upset against said strips to secure the latter in the slots.

* * * * *